United States Patent
Baba (10) Patent No.: US 12,360,061 B2
(45) Date of Patent: Jul. 15, 2025

(54) X-RAY RADIOSCOPE

(71) Applicant: BEAMSENSE Co., Ltd., Suita (JP)

(72) Inventor: Sueki Baba, Suita (JP)

(73) Assignee: BEAMSENSE Co., Ltd., Suita (JP)

( * ) Notice: Subject to any disclaimer, the term of this patent is extended or adjusted under 35 U.S.C. 154(b) by 216 days.

(21) Appl. No.: 18/044,454

(22) PCT Filed: Sep. 7, 2021

(86) PCT No.: PCT/JP2021/032844
§ 371 (c)(1),
(2) Date: Mar. 8, 2023

(87) PCT Pub. No.: WO2022/054794
PCT Pub. Date: Mar. 17, 2022

(65) Prior Publication Data
US 2023/0366836 A1    Nov. 16, 2023

(30) Foreign Application Priority Data
Sep. 10, 2020 (JP) ................. 2020-152116

(51) Int. Cl.
*G01N 23/044* (2018.01)
*G01N 23/083* (2018.01)
*G01N 23/10* (2018.01)

(52) U.S. Cl.
CPC .......... *G01N 23/10* (2013.01); *G01N 23/044* (2018.02); *G01N 23/083* (2013.01);
(Continued)

(58) Field of Classification Search
CPC .... G01N 23/044; G01N 23/083; G01N 23/10; G01N 2223/1016; G01N 2223/306; G01N 2223/401; G01N 2223/6113
See application file for complete search history.

(56) References Cited

U.S. PATENT DOCUMENTS 6,324,249 B1 * 11/2001 Fazzio ................. G01N 23/044
378/22
8,912,503 B2 * 12/2014 Matoba ............... G01N 23/083
250/336.1
(Continued)

FOREIGN PATENT DOCUMENTS

JP       2000-050063 A    2/2000
JP       2009168590 A    7/2009
(Continued)

OTHER PUBLICATIONS

Machine translation of JP 2014-089094 A, cited in the IDS filed Mar. 8, 2023 (Year: 2014).*
(Continued)

*Primary Examiner* — Thomas R Artman
(74) *Attorney, Agent, or Firm* — Maier & Maier, PLLC (57) ABSTRACT

An X-ray radioscope includes: an X-ray source that radially emits X-ray; a sample holder configured to hold a sample, the sample holder placed in front of the X-ray source in order for the sample to be irradiated by X-ray emitted from the X-ray source; a planar CCD including CCDs planarly arranged, the planar CCD being placed away from the sample holder to detect X-ray transmitted through the sample such that the planar CCD obtains X-ray transmission image of the sample; and a movement unit configured to move the planar CCD and the sample holder relative to each other in synchronization with obtaining the X-ray transmission image by the planar CCD, wherein the planar CCD has 500 or more pixels along the movement direction relative to the sample.

9 Claims, 7 Drawing Sheets

(52) U.S. Cl.
CPC ............... *G01N 2223/1016* (2013.01); *G01N 2223/306* (2013.01); *G01N 2223/401* (2013.01); *G01N 2223/6113* (2013.01)

(56) References Cited

U.S. PATENT DOCUMENTS

| | | | | |
|---|---|---|---|---|
| 9,402,042 | B2* | 7/2016 | Parker | H04N 3/1525 |
| 9,426,400 | B2* | 8/2016 | Brown | H04N 25/745 |
| 9,863,896 | B2* | 1/2018 | Matoba | G01N 23/083 |
| 2013/0032728 | A1* | 2/2013 | Matoba | G01N 23/083 |
| | | | | 250/394 |
| 2014/0104468 | A1 | 4/2014 | Parker et al. | |
| 2014/0158864 | A1 | 6/2014 | Brown et al. | |
| 2015/0276626 | A1 | 10/2015 | Matoba | |
| 2016/0041110 | A1 | 2/2016 | Matoba et al. | |
| 2020/0234431 | A1 | 7/2020 | Kim et al. | |
| 2023/0366836 | A1* | 11/2023 | Baba | G01N 23/10 |

FOREIGN PATENT DOCUMENTS

| | | |
|---|---|---|
| JP | 2011-149701 A | 8/2011 |
| JP | 2011-242374 A | 12/2011 |
| JP | 2014-089094 A | 5/2014 |
| JP | 2015043174 A | 3/2015 |
| JP | 2015-194423 A | 11/2015 |
| JP | 2015531580 A | 11/2015 |
| JP | 2016500493 A | 1/2016 |
| JP | 2018105839 A * | 7/2018 |
| WO | 2020004435 A1 | 1/2020 |

OTHER PUBLICATIONS

International Search Report issued on Nov. 30, 2021, in corresponding application No. PCT/JP2021/032844; 7 pgs.
Notification of Transmittal of Translation of the International Preliminary Report on Patentability issued on Mar. 23, 2023, in corresponding International Application No. PCT/JP2021/032844, 16 pages.
Extended European Search Report issued on Aug. 26, 2024, in corresponding European Application No. 21866753.3, 7 pages.
Office Action issued on Jan. 21, 2025, in corresponding Japanese Application No. 2022-547603, 12 pages.
Notification of Reasons for Refusal issued on Apr. 30, 2025, in corresponding Japanese Patent Application No. 2022-547603, 14 pages.

* cited by examiner

X-RAY RADIOSCOPE

FIELD

This invention is related to an X-ray radioscope, which enables the inspection of the numerous micro electric parts, such as capacitors, stored in the standard carrier-tape reel.

BACKGROUND

Conventionally, in the industry of the surface mount circuit board, due to the small size of the individual electric parts and the high mounting speed, numerous parts are stored in a plastic carrier-tape and the tape is rounded up in a reel. As the types and the numbers of parts increase, the management of the individual parts stored in the carrier-tape reel becomes a critical issue. For this reason, the length of the rest of carrier tape is measured and the number of the parts remaining in the reel is estimated from thus obtained length. In order to measure the length, the carrier tape is usually wound up in another reel and wound back. Since the carrier tape is wound twice, the possibility of the failure of the tape is not negligible.

Therefore, a non-destructive inspection using X-ray radioscopy is expected to avoid winding up the tape. As an X-ray radioscopy, a tiling method is often used in order to get the image of the large reel in high resolution. In the tiling method, the full field of view of the large reel is divided into many small regions and the X-ray radioscopy is applied to each small region. Then, the images of the small regions are combined in a single large image. This provides an X-ray radioscopic image of the large reel in high spatial resolution. From the obtained large X-ray radioscopic image of the reel, the number of the parts is counted from the gray scale level of the image.

However, the tiling method inevitably takes a long time for image processing. Furthermore, the mismatch of the parallax angle between the adjacent small regions cause the artifacts at the boundary of the regions during the image processing.

On the other hand, the time delay integration method (TDI method) is also known as the method to image the large filed of view, as shown in JPA 2000-50063. In the TDI method, instead of a line sensor, a TDI sensor having a multiple line sensor aligned perpendicular(virtual) to the line sensor direction (for example, 100 pixels), and the charge transfer of the TDI sensor is performed in accordance with the synchronized movement of the object in the vertical direction. In this case, charges on the line sensor are sequentially transferred and accumulated to the next line sensor. As a result, the brightness the image increases during the charge transfer in the vertical direction, and noises are also reduced. In addition, the high sensitivity in the image acquisition is achieved without increasing duration time.

Although the width of the multiple line sensor along vertical direction is usually about 100 lines, the length along horizontal (along line sensor) direction is relatively long enough to cover large reel. Also, if the intensity of the X-ray source is not sufficient, the accumulation along the vertical 100 pixels is not enough to achieve enough quality of the image.

SUMMARY

Therefore, the present invention provides an X-ray radioscope that has a short effective duration time for the image acquisition while suppressing the overlaps of images due to the parallax, and also provides the sufficient sensitivity even in the case of low dose X-ray source.

In one general aspect, the techniques disclosed here feature: a X-ray radioscope includes:
- an X-ray source that radially emits X-rays;
- a sample holder that holds a sample, the sample holder being placed in front of the X-ray source in order for the sample to be irradiated by the X-ray emitted from the X-ray source;
- a planar CCD including CCDs planarly arranged, the planar CCD being placed away from the sample holder to detect X-ray transmitted through the sample such that the planar CCD obtains X-ray transmission image of the sample; and
- a movement unit that moves the planar CCD and the sample holder relative to each other in synchronization with obtaining the X-ray transmission image by the planar CCD,
- wherein the planar CCD has 500 or more pixels along the movement direction relative to the sample.

According to the X-ray radioscope of the present invention, the effective duration time of the image acquisition is short, the overlapping due to the parallax is suppressed, and sufficient signal-to-noise ratio is obtained even with low X-ray dose.

DETAILED DESCRIPTION

A X-ray radioscope according to a first aspect, includes:
- an X-ray source that radially emits X-rays;
- a sample holder that holds a sample, the sample holder being placed in front of the X-ray source in order for the sample to be irradiated by X-ray emitted from the X-ray source;

a planar CCD including CCDs planarly arranged, the planar CCD being placed away from the sample holder to detect X-ray transmitted through the sample such that the planar CCD obtains X-ray transmission image of the sample; and a movement unit that moves the planar CCD and the sample holder relative to each other in synchronization with obtaining the X-ray transmission image by the planar CCD, wherein the planar CCD has 500 or more pixels along the movement direction relative to the sample.

Further as a X-ray radioscope according to a second aspect, in the first aspect, the planar CCD may be a time-delay integration type (TDI) sensor with a time delay integration method along the direction of movement relative to the sample.

Further, as a X-ray radioscope according to a third aspect, in the first aspect, the movement unit may move the sample holder along one direction that intersects the central axis of the radial X-ray in synchronization with obtaining the X-ray transmission image by the planar CCD.

Further, as a X-ray radioscope according to a fourth aspect, in the first aspect, the movement unit may move the planar CCD along one direction that intersects the central axis of the radial X-ray in synchronization with obtaining the X-ray transmission image by the planar CCD.

Further, as a X-ray radioscope according to a fifth aspect, in the first aspect, the movement unit may move the both of the planar CCD and the sample holder in opposite directions of each other along one direction that intersects the central axis of the radial X-ray in synchronization with obtaining the X-ray transmission image by the planar CCD Further, as a X-ray radioscope according to a sixth aspect, in the first aspect, in the case where the sample includes a plurality of parts in a plane, further may includes an image processing unit that identifies and measures a plurality of parts in the sample based on the intensity change of the X-ray transmission image of the sample including X-rays transmitted through the sample.

Further, as a X-ray radioscope according to a seventh aspect, in the first aspect, when each part of the sample has a height h along the central axis of the X-ray, and the sample includes a plurality of parts spaced at an interval t1 along the direction of relative movement between the planar CCD and the sample in the plane, the planar CCD is arranged to satisfy the following equation, wherein the following equation is $\theta 1 < \arctan(t1/h)$ with respect to a maximum inclination angle $\theta 1$ from the central axis of the X-ray along the direction of relative movement.

Further, as a X-ray radioscope according to an eighth aspect, in the first aspect, when each part of the sample may have a height h along the central axis of the X-ray, and the sample includes a plurality of parts in the plane that are spaced apart by an interval t2 along the direction of relative movement between the plane CCD and the sample and the direction perpendicular to the central axis of the X-ray, the planar CCD may be arranged to satisfy the following equation, wherein the following equation is $\theta 2 < \arctan(t2/h)$ with respect to the maximum inclination angle $\theta 2$ of said X-ray from said central axis along a direction perpendicular to said direction of relative movement.

Further, as a X-ray radioscope according to a ninth aspect, in the first aspect, the planar CCD may be arranged so that in the relative movement of the sample holder and the planar CCD, the imaging ranges are adjacent to each other in the direction perpendicular to the relative movement direction of the sample and the central axis of the X-ray, further may include two or more planar CCDs with different charge transfer directions from each other.

Further, as a X-ray radioscope according to a tenth aspect, in the first aspect, the moving speed of the sample to be detected and the transfer rate of the image signal generated in the planar CCD are synchronized, and multiple conditions for the moving speed of the sample and the transfer rate of the image signal are set.

The X-ray radioscopes of the above cases will be described below with reference to the accompanying drawings. In addition, the same code means the same subjected in all drawings.

Embodiment 1

Figures 1A, 1B:
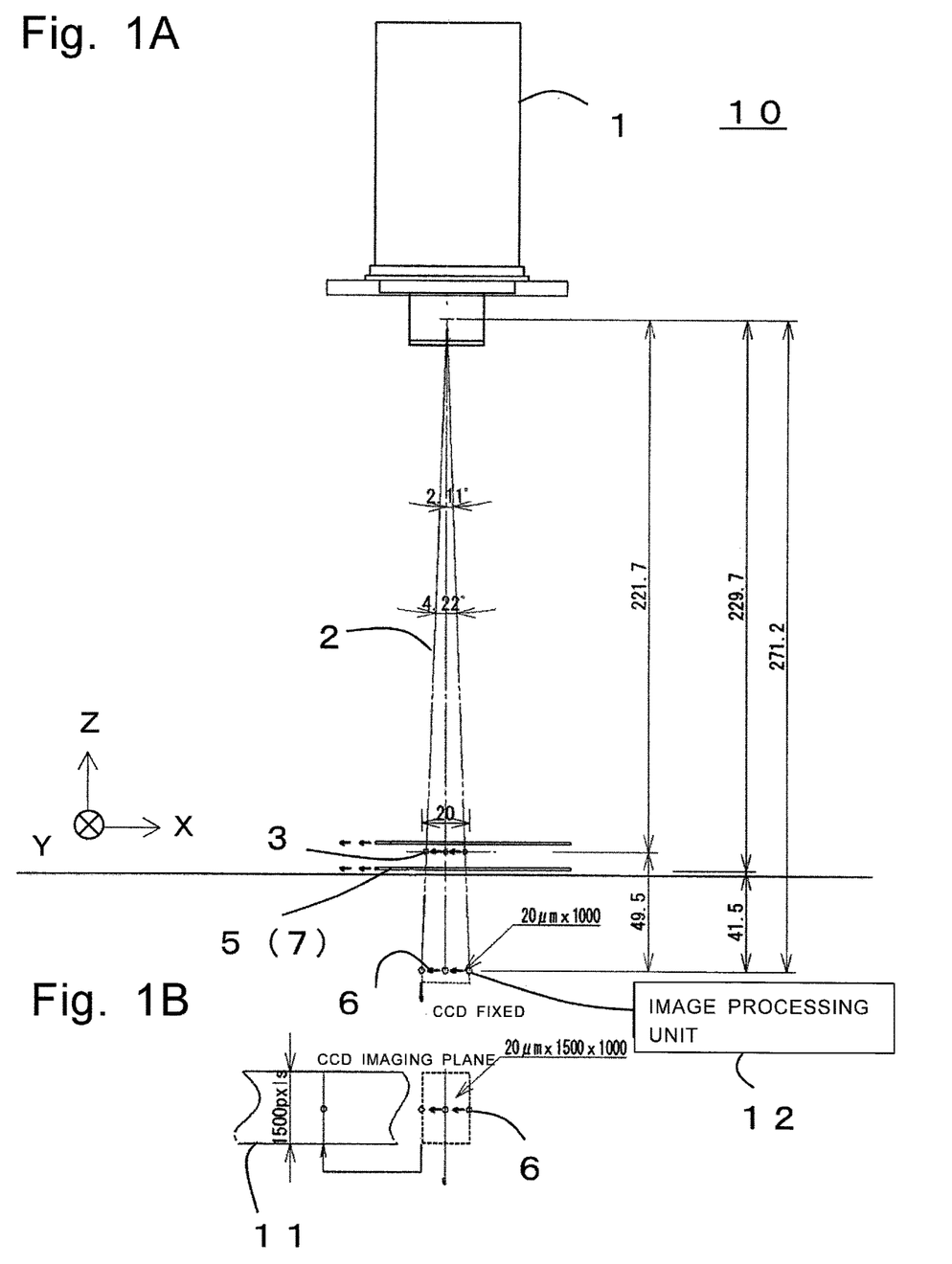
FIG. 1A is a schematic configuration of the X-ray radioscope viewing from the direction perpendicular to the X-ray irradiation direction.
FIG. 1B is a plan view of a planar CCD and an example of the image obtained by the CCD.

FIG. 1A is a schematic diagram of the X-ray radioscope (10) viewed from the direction perpendicular to the X-ray (2) irradiation direction, and FIG. 1B is the plan view of the planar CCD with the schematic illustration of the X-ray transmission image. In the drawings, the direction of relative movement between the planar CCD and the sample is taken as X direction, the vertically upward direction is taken as Z direction, and the direction of one line of the planar CCD is taken as Y direction for convenience. The X-ray radioscope (10) of the embodiment 1 consists of an X-ray source (1), the sample holder (5), the planar CCD (6) and the movement system (7) to move the sample holder (5). The sample holder holds the sample so that the diverging X-rays are irradiation toward the surface of the sample. The planar CCDs placed in a planar manner accumulate the X-rays passing through the sample. Also, the planar CCDs are placed away farer than the sample holder from the X-ray source. The planar CCD has 500 or more pixels along the movement direction. The movement system move the sample holder synchronizing with the image acquisition of the planar CCDs. In this X-ray radioscope, high X-ray sensitivity can be achieved even for the low dose X-ray incident, since the signal integration period along the movement direction of the planar CCD which has 500 or more pixels along the movement is effectively longer than the case of TDI.

Each member constituting the X-ray radioscope (10) is described below.

<X-Ray Source>

An X-ray source (1) irradiates the diverging X-rays (2) toward the sample. As the X-ray source (1), a microfocus X-ray source with relatively weak X-ray intensity can be used instead of the normal X-ray source, <Sample>

Figure 2:
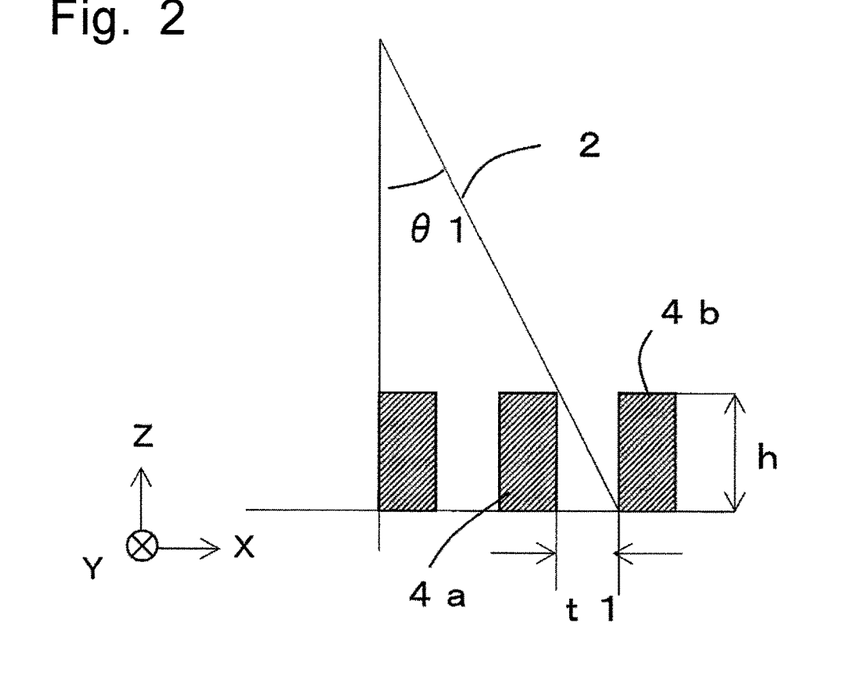
FIG. 2 is a schematic diagram showing the relationship between the height of the objects and their interval along the relative movement direction. The divergence of the X-ray does not overlap the adjacent object.
Figure 3:
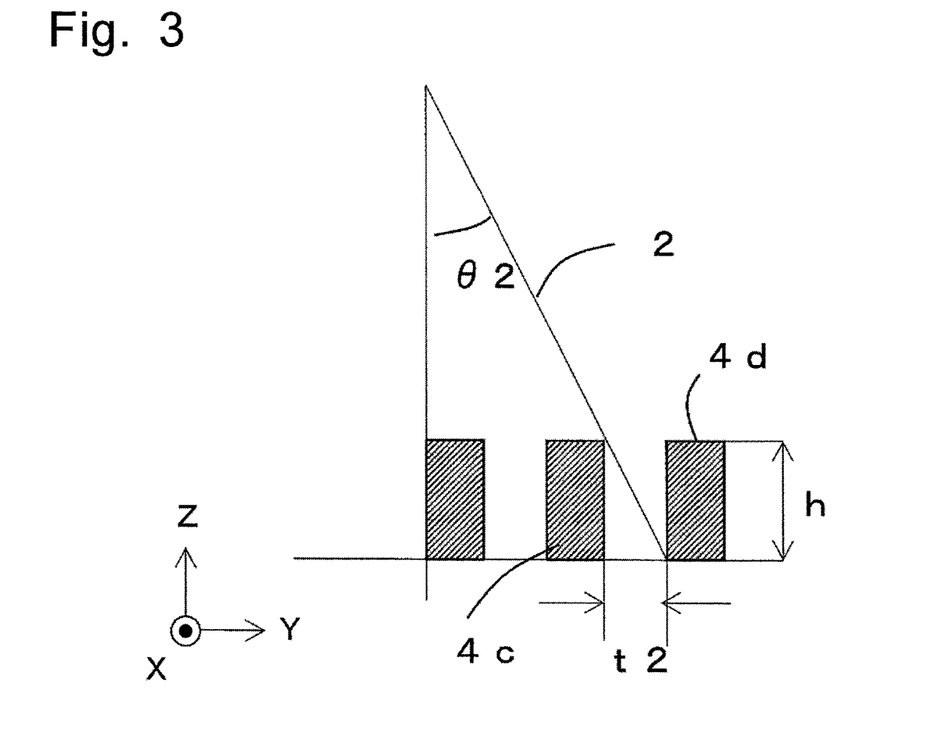
FIG. 3 is a schematic diagram showing the relationship between the height of the objects and their interval along the perpendicular direction to the movement direction. The divergence of the X-ray does not overlap the adjacent object.
Figure 5:
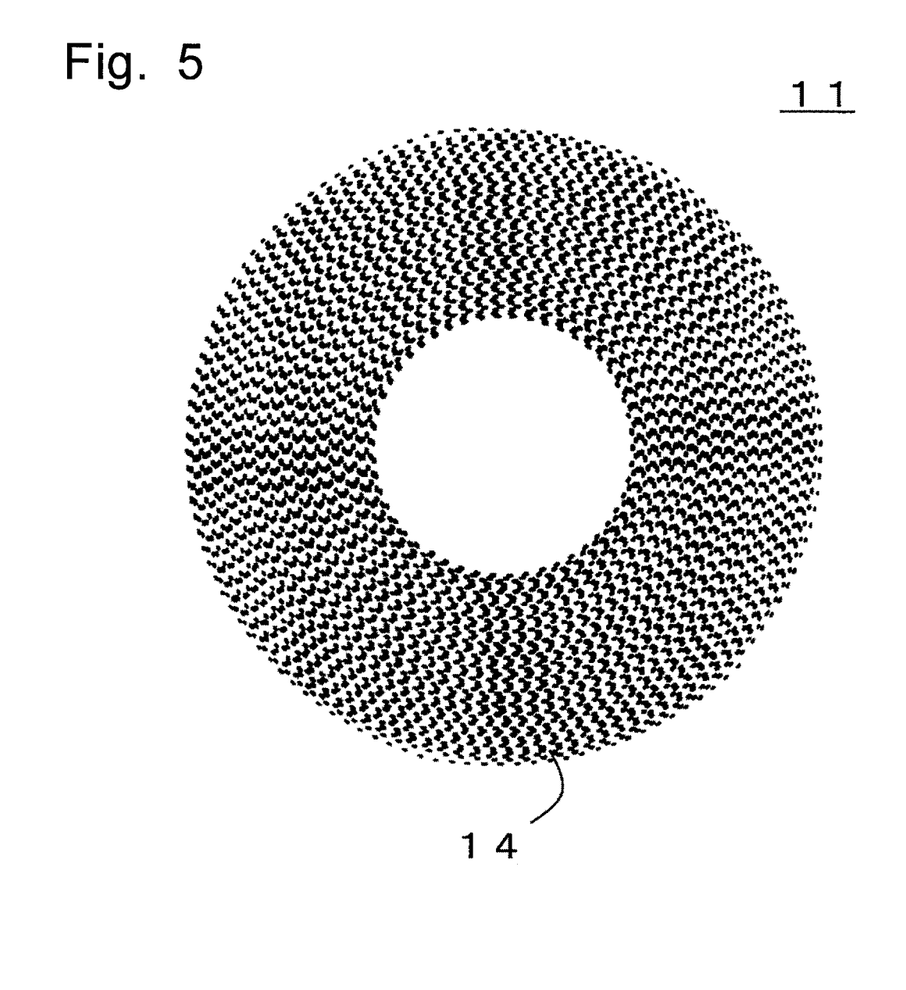
FIG. 5 is an example of the X-ray radioscopic image of a carrier-tape reel in which a tape with many electric parts is wound.

FIG. 5 is an X-ray radioscopic image (11) of a disk-shaped carrier-tape reel including a plurality of electric parts. The sample (3) may be, for example, a disk-shaped reel wound with a tape in which a plurality of parts (4), such as capacitors, as shown in FIGS. 2 and 3. It should be noted that each part (4) is spaced radially from the center of the reel by at least the thickness of the tape. As shown in the image (14) in FIG. 5, the parts are arranged with an interval so that each part can be identified. In addition, the parts also has an interval along the circumference direction of the reel. Specifically, the part (4) is housed in a hole provided in the tape body, and covered by the tapes on both sides in order to avoid dropping out. The total thickness of the cover tapes of the both sides is, for example, about 0.1 mm. The sample is not limited to a disc-shaped reel. The only condition is that the X-ray transmission observation can be done. In FIG. 1, the typical distance from the X-ray source (1) to the sample (3) is, for example, 221.7 mm.

<Sample Holder>

Sample (3) is held by sample holder (5). A sample holder (5) holds the sample so that the X-rays (2) are irradiated on the surface of the sample (3). In FIG. 1, the typical distance from the X-ray source (1) to the sample holder (5) is, for example, 229.7 mm.

<Planar CCD>

The planar charge coupled device (CCD) (6) that receives the X-rays (2) has a plurality of lines not only in the Y direction but also in X direction. The planar CCD (6) is located away from the sample holder (5) at the opposite side of the X-ray source (1). The planar CCD (6) enables us to obtain the x-ray transmission image of the sample (3). The planar CCD (6) has more than 500 pixels along the movement direction (X direction) of the sample (3). The timing of the charge transfer of the planar CCD (6) is synchronized with the relative motion of the sample. In other words, the charge transfer rate of the planar CCD (6) agrees with the speed of the movement of the sample. The synchronization of the charge transfer with the sample movement enables the accumulation of the transmitted X-rays while the movement of the sample along 500 pixel, and hence the 500 times of X-ray count in comparison to the linear imaging sensors. The number of pixels along the movement direction may be more than 1000 pixels. In FIG. 1, the angle between the edge of the planar CCD (6) and the center axis of X-rays is 4.22 degree. The distance from the sample (3) to the planar CCD (6) is 49.5 mm, the distance from sample holder (5) to the planar CCD (6) is 41.5 mm, and the distance from X-ray source (1) to the planar CCD (6) is 271.2 mm. The planar CCD (6) is a time delay integration sensor (TDI) which accumulates the X-rays along the movement direction of the sample. In this case, the charge transfer direction of the planar CCD (6) has to coincide with the movement direction of the sample.

FIG. 2 is a schematic diagram showing the relationship among the height (h) of the part (4), the interval of the parts (t1) along the movement direction (X direction) of the sample (3), and the angle theta 1 ($\theta$1) from the central axis of the X-ray (2) to the adjacent parts (4) without overlapping. FIG. 3 is a schematic diagram showing the relationship among the height of the part (4), the interval of the parts (t2) along the perpendicular to the movement direction (Y direction) of the sample (3), and the angle theta 2 ($\theta$2) from the central axis of the X-ray (2) to the adjacent parts (4) without overlapping.

In FIG. 2, each part (4a and 4b) of the sample (3) has a height (h) along the direction of the central axis of the X-ray (2), and the interval (t1) along the movement direction (X direction) in the parallel pane with the planar CCD. If the t1 is not appropriate, the upper region of the transmission image of the part 4a and the lower region of that of the part 4b. In such a case, the images at the overlapped region may cause the confusions in image processing due to the difficulties in separating the images of each part. Therefore, the angle theta 1 ($\theta$1) between the central axis of the X-ray source (1) and the maximum angle of X-rays (2) may be adjusted as satisfying the condition, theta 1 ($\theta$1)<arc tangent of t1/h. As a result, overlapping of images of adjacent parts 4a and 4b can be suppressed.

In FIG. 3, each part (4c and 4d) of the sample (3) has a height (h) along the direction of the central axis of the X-ray (2), and the interval (t2) along the perpendicular direction to the movement direction (Y direction) in the parallel pane with the planar CCD. If the t2 is not appropriate, the upper region of the transmission image of the part 4c and the lower region of that of the part 4d. Therefore, the angle theta 2 ($\theta$2) between the central axis of the X-ray source (1) and the maximum angle of X-rays (2) may be adjusted as satisfying the condition, theta 2 ($\theta$2)<arc tangent of t2/h. As a result, overlapping of images of adjacent parts 4c and 4d can be suppressed.

Figure 4:
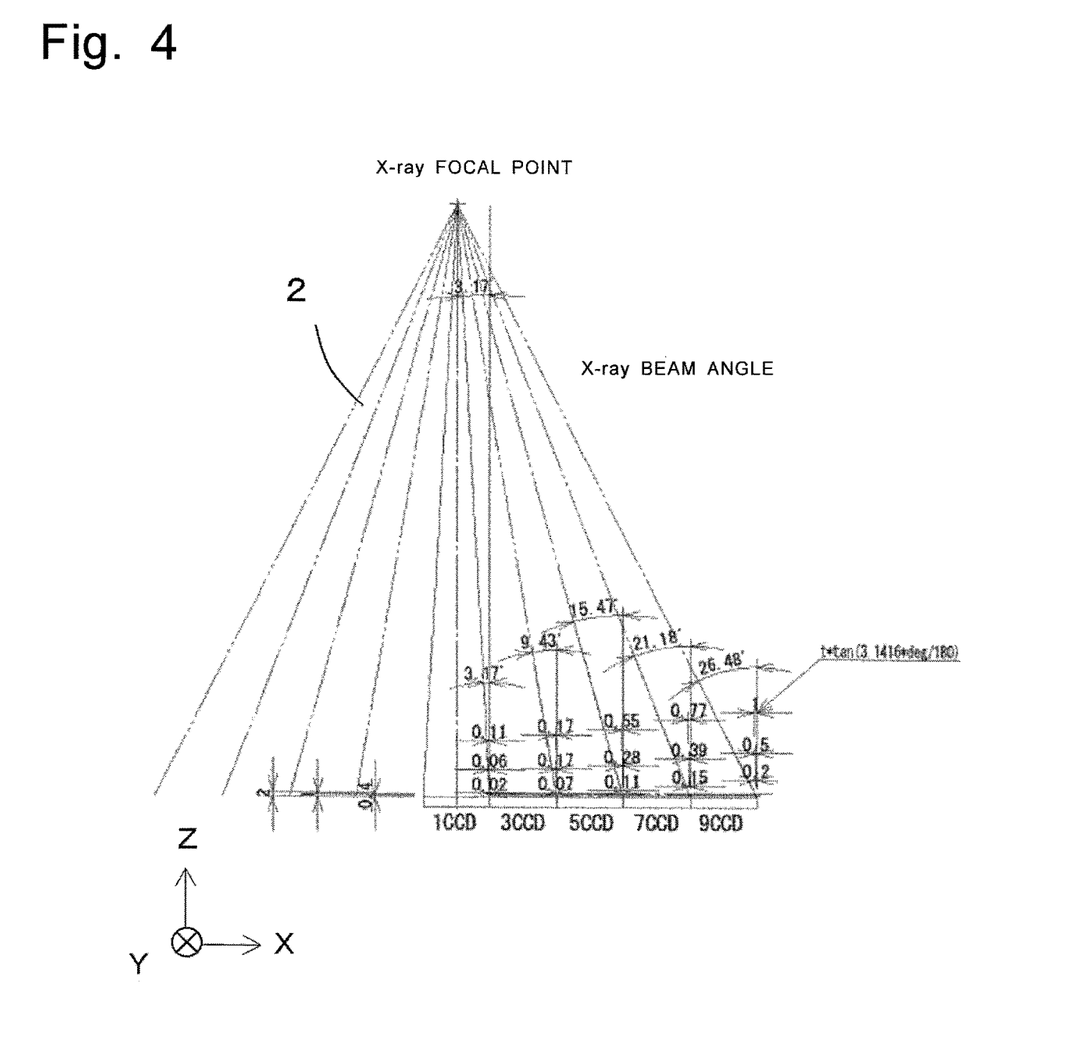
FIG. 4 is a schematic illustration showing the relationship among the height and interval of the objects, and the angle the divergent X-rays.

FIG. 4 is a schematic diagram showing the relationship among the height, the inteval of various parts, and the angle from the central axis of the X-rays. Specifically, in the case that the height of the part (h) is 2 mm and the interval of the parts (t1 or t2) is 1 mm, the appropriate maximum angle theta 1 ($\theta$1) and theta 2 ($\theta$2) becomes 26.48 degree. In the case that the height of the part (h) is 2 mm and the interval of the parts (t1 or t2) is 0.55 mm, the appropriate maximum angle theta 1 ($\theta$1) and theta 2 ($\theta$2) becomes 15.47 degree. In the case that the height of the part (h) is 2 mm and the interval of the parts (t1 or t2) is 0.11 mm, the appropriate maximum angle theta 1 ($\theta$1) and theta 2 ($\theta$2) becomes 3.17 degree. In addition, if the ratio of h and t1 or t1 is same, the appropriate maximum angle is also same. For example, in the case that the height of the part (h) is 1 mm and the interval of the parts (t1 or t2) is 0.5 mm, the appropriate maximum angle theta 1 ($\theta$1) and theta 2 ($\theta$2) is same as the case for h=2 mm and t1 or t2=1 mm. Therefore FIG. 4 shows the same appropriate maximum angle theta 1 ($\theta$1) and theta 2 ($\theta$2) for h=2,1 and 0.4 mm respectively.

FIG. 4 also shows the cases of the single CCD placed at the center of the diverging X-rays (2) and of the plurality of CCDs placed asides of the diverging X-rays (2). As decreasing the interval between the parts, the maximum angle of X-rays allowed for avoiding the overlaps of the transmission images gets also decreased, for example, the maximum angle is 3.17 degree for the case of the height of parts h=2.0 mm and the interval t (t1 or t2)=11 mm. In this case, the single CCD with 1500×1000 pixels is sufficient for the image acquisition. On the other hand, the maximum angle theta1 ($\theta$1) or theta 2 ($\theta$2) is 26.48 degree for the case of the height of parts h=2.0 mm and the interval t1 or t2=26.48 mm. In this case, nine CCDs along the movement direction are requited. However, the sufficient X-ray counts cannot be obtained due to the high angle X-rays. So that, in this case, one CCD may be used instead of using nine CCDs and the CCD or sample may be moved to receive the light, leading the bright transmission images.

<Movement Unit>

The movement unit (7) moves the sample holder (5) and the planar CCDs (6) synchronously with the image acquisition by the planar CCDs (6). For example, the movement unit (7) may move the sample holder (5) along the direction that intersects the central axis of the diverging X-rays (5) synchronously with the image acquisition by the planar CCDs (6). In this case the planar CCDs are fixed at the central axis while keeping the angle of X-rays small, and hence the transmission at the specific position can be enhanced. This feature has advantages for example in counting the number of parts in the tape-carrier reel from the transmission image due to the low X-ray angles.

The movement unit (7) may move the planar CCDs (6) along the direction that intersects the central axis of the S-rays (2) synchronously with the image acquisition by the planar CCDs (6). In this case, the wide angle range of X-rays are accumulated in a transmission image. The movement unit (7) also may move both the sample holder (5) the planar CCDs (6) along the direction that intersects the central axis of the S-rays (2) synchronously with the image acquisition by the planar CCDs (6). In this case the sample holder (5) is reversely moved against the planar CCDs (6). In this case, the maximum angle of X-rays and the movement rage of the sample can be suppressed. Summarizing, the movement unit (7) may move any of the sample holder (5) and the planar CCDs (6) or both of them. It should be noted that the planar CCDs should move beyond the maximum X-ray angle determined by the sample height, h, and the interval, t1 and/or t2 shown in FIG. 4.

<Image Processing Unit>

The embodiment may have the image processing unit (12) providing some measurement functionalities. The image processing unit (12) enables to count the number of the parts in the transmission image according to the gray scale information. The image processing unit (12) may consist of the software on a computer system.

<About Magnification and Amount of Movement>

As shown in FIG. 1, the distance from the X-ray source (1) to the sample 3 is 221.7 mm, and the distance from the sample (3) to the planar CCD is 49.5 mm. In this case the magnification of the sample point is (221.7+49.5)/221.7=1.223. A transmission image is acquired and recorded. Next, the sample is moved by the length of the pixel of the CCD reduced by the magnification. Then, the next transmission image is acquired and recorded. By repeating this process, the transmission images can be recorded continuously.

If the sample has a negligible thickness along the X-ray irradiation direction (Z direction), the image is blurred due to the overlaps of the magnification difference between the top and bottom in the sample. Conventionally, the transmission images are acquired successively while moving the CCDs by the width of the sensor, while the use of TDI cover the wide field of view and decrease the image acquisition duration. The TDI also has advantages in decreasing duration time in cross-sectional imaging due to the contiguous connection between sensors. Especially, when the planar CCD is moved, an image can be captured as if there is a long sensor in the movement direction. In the X-ray radioscope of this invention, the cross-sectional information can be obtained from the blurs along the sample thickness direction in the transmission images since 500 or more pixels are available along the movement direction.

Embodiment 2

Figure 6:
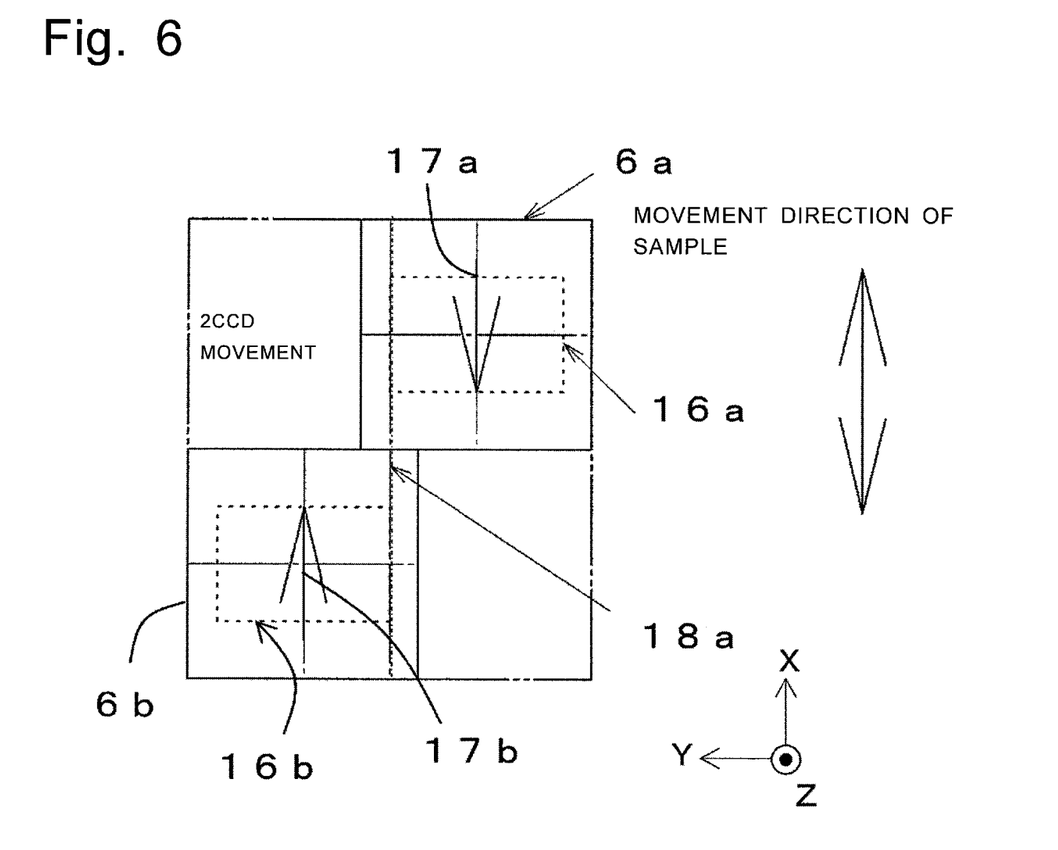
FIG. 6 is a schematic plan view of the X-ray radioscope coupled with two CCDs, which are obliquely placed each other along the direction perpendicular to the sample movement.
Figure 7:
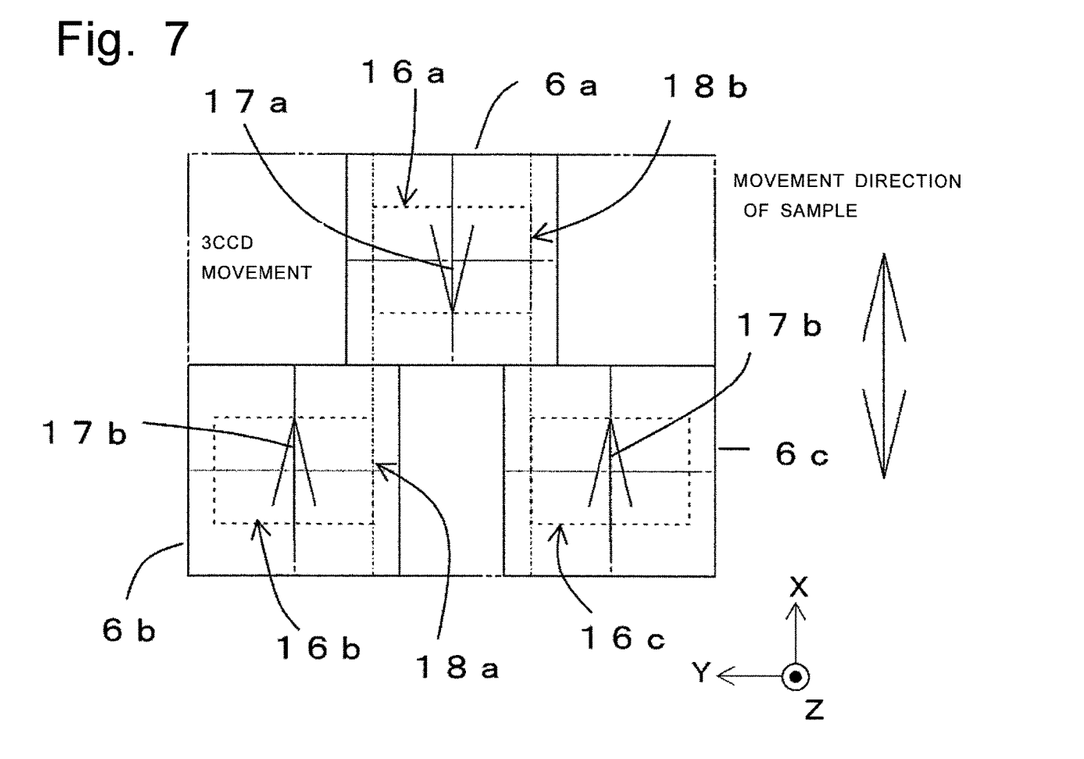
FIG. 7 is a schematic plan view of In X-ray radioscope concerning on Modification 1 of Embodiment 2. Three planar CCDs are placed in the zig-zag manner along the direction perpendicular to the sample movement.
Figure 8:
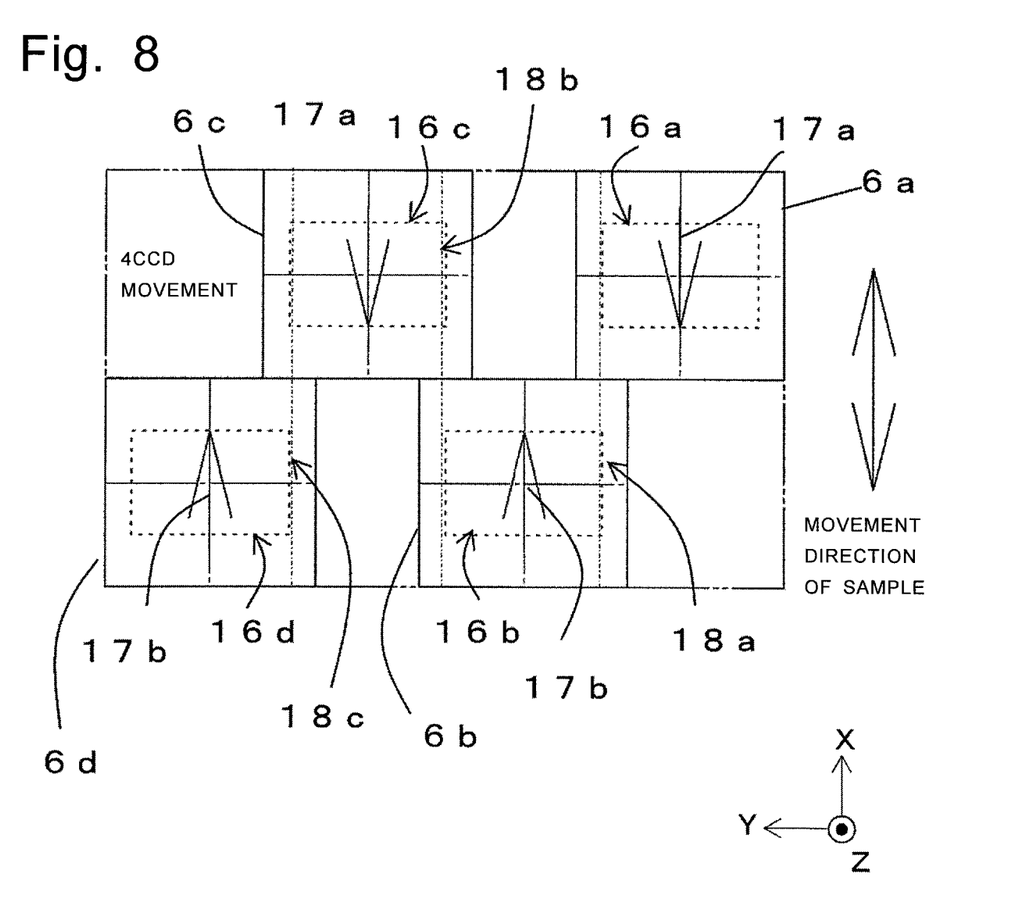
FIG. 8 is a schematic plan view of In X-ray radioscope concerning on Modification 1 of Embodiment 2. Four planar CCDs are placed in the zig-zag manner along the direction perpendicular to the sample movement.

FIG. 6 shows the planar schematic layout of the X-ray radioscope according to the embodiment 2, including the two planar CCDs (6a and 6b) in the parallel manner along the sample movement direction (X) and the perpendicular direction to the center axis of diverging X-rays. FIG. 7 shows the planar schematic layout of the X-ray radioscope according to the embodiment 2, including the three planar CCDs (6a and 6b) in the parallel manner along the sample movement direction (X) and the perpendicular direction to the center axis of diverging X-rays. FIG. 8 shows the planar schematic layout of the X-ray radioscope according to the modification 2 of the embodiment 2, including the four planar CCDs (6a and 6b) in the parallel manner along the sample movement direction (X) and the perpendicular direction to the center axis of diverging X-rays.

The two planar CCDs (6a and 6b) in the radioscope according to the embodiment 2 and their imaging region (16a and 16b) are obliquely places as their edges are along X-axis of the movement direction and Y-axis of the perpendicular direction to the center axis of diverging X-rays and X-axis, as shown in FIG. 6. The CCDs (6a and 6b) has the effective field of views of (16a and 16b) which are adjacent to each other along Y-axis but only slightly. The charge transfer direction (17a) of the CCD (6a) and that (17b) of CCD (6b) are also adjacent to each other at the edges of their field of views (17a). It should be noted that the charge transfer directions (17a and 17b) are opposite. This has an advantage in utilizing both back and forth movement by using the CCD (6a) for going and the CCD (6b) for coming back with respect to the adjacent planar CCDs 6a and 6b in the Y direction.

(Modification 1)

As shown in FIG. 7, the radioscope according to the modification 1 of the embodiment 2 has three planar CCDs (6a, 6b and 6c) in the zig-zag manner, where the third CCD (6c) is added at the oblique position to the two CCDs (6a and 6b) in FIG. 6. In FIG. 7, third CCD (6c) is placed at the adjacent to the planar CCD (6a) along the Y-axis, but it may be placed at the adjacent to the planar CCD (6b). The charge transfer direction (17b) of third CCD (6c) is opposite to that (17a) of the planar CCD (6a). In this geometry, the CCD (6a) is used in the forth-movement while two other CCDs (6b and 6c) can be used in the back-movement. This means that the field of views of (16a, 16b and 16c) can be scanned along X-axis in a single back-and-forth movement. That is, the amplitude of the back-and-forth movement is the length of the field of views (16a, 16b and 16c) along Y-axis.

(Modification 2)

As shown in FIG. 8, the X-ray radioscope according to the modification 2 of the embodiment 2 has four planar CCDs (6a, 6b, 6c and 6d), where the additional CCDs (6c and 6d) are additionally attached to the layout shown in FIG. 6 along the Y direction as adjacent to the CCDs (6a and 6b) in a zig-zag manner. Third CCD (6c) is located as its charge transfer direction (17a) is opposite to that of the CCD (6b) which has the common edge at Y direction. Fourth CCD (6d) is located as its charge transfer direction (17b) is opposite to that of the CCD (6c) which has the common edge at Y direction. In this geometry, the CCDs (6a and 6c) are used in the forth-movement while two other CCDs (6b and 6d) can be used in the back-movement. This means that the field of views of (16a, 16b, 16c and 16d) can be scanned along X-axis in a single back-and-forth movement by four planar CCDs (Gam 6b, 6c and 6d). That is, after moving the sample back and forth in the X direction, the sample should be shifted in the Y-axis in units of the length of the four imaging ranges (16a, 16b, 16c and 16d).

Embodiment 3

The X-ray radioscope according to the embodiment 3 has multiple conditions, for example speed, in the movement of the sample and the planar CCDs beside the synchronization with the charge transfer. The multiple conditions include the various combinations of the synchronous movement of the sample and charge transfer. This enables the reconstruction of the 3D structural data of the sample from many transmission images obtained with thus various conditions.

It should be noted that increasing the distance of the charge transfer can enhance the resolution along the thickness direction of the reconstructed image. In other words, in order to obtain a high resolution 3D image, large magnification helps in increasing the spatial resolution along the sample thickness direction. Larger magnification enlarges the image in the field of view, and hence the interlayer layer resolution of the sample is increased, that is, the size of the pixel is reduced.

The X-ray radioscope according to the embodiment 3 has the functionalities for the 3d image reconstruction and the iterative image acquisitions of the large 3d object through synchronous one-dimensional movement synchronously with the charge transfer of the CCDs. Even in 2d transmission image, the large field of view enables the precise count of the parts enclosed in the carrier-tape reel. Furthermore, the 3d reconstruction including the depth information calculated from the various conditions can separate the image at the specific depth of the sample. For example, this enables the extraction of each circuit pattern in the multilayer circuit board.

Conventionally, there are several methods to obtain 3d information, such as the computerized tomography with uniaxial rotation and the laminography utilized by the parallax information. However, those apparatus may be expensive and/or large, and also the duration period of the image acquisition may be long. This invention according to the embodiment 3, the apparatus can be small and hence the relatively cheap, and also the duration period of the image acquisition can be short.

It should be noted that any of claims in this invention can be combined and the possible embodiments are not limited the cases mentioned above, and the effects pointed above can be expected in each embodiment.

This X-ray radioscope according to this invention reduces the duration time for the image acquisition, suppresses the overlaps of the transmission image of the laterally aligned parts, and enhance the image intensity even for low X-ray dose. Therefore, this X-ray radioscope is efficiently available for counting the number of parts, such as small capacitors, enclosed in the carrier-tape reel.

What is claimed is:

1. An X-ray radioscope, comprising:
an X-ray source that radially emits X-rays;
a sample holder that holds a sample, the sample holder placed in front of the X-ray source in order for the sample to be irradiated by X-rays emitted from the X-ray source;
a planar charge coupled device (CCD) including CCDs planarly arranged, the planar CCD being placed away from the sample holder to detect X-rays transmitted through the sample such that the planar CCD obtains an X-ray transmission image of the sample; and
a movement unit that moves the planar CCD and the sample holder relative to each other in synchronization with obtaining the X-ray transmission image by the planar CCD,
wherein the planar CCD has 500 or more pixels along a movement direction relative to the sample, and
wherein the planar CCD is arranged so that in relative movement of the sample holder and the planar CCD, imaging ranges are adjacent to each other in a direction perpendicular to the relative movement direction of the sample and a central axis of the X-ray, and
the X-ray radioscope further comprises two or more planar CCDs with different charge transfer directions from each other.

2. The X-ray radioscope according to claim 1, wherein the planar CCD is a time-delay integration type (TDI) sensor with a time delay integration method along the direction of movement relative to the sample.

3. The X-ray radioscope according to claim 1, wherein the movement unit moves the sample holder along one direction that intersects a central axis of the radial X-ray in synchronization with obtaining the X-ray transmission image by the planar CCD.

4. The X-ray radioscope according to claim 1, wherein the movement unit moves the planar CCD along one direction that intersects a central axis of the radial X-ray in synchronization with obtaining the X-ray transmission image by the planar CCD.

5. The X-ray radioscope according to claim 1, wherein the movement unit moves both of the planar CCD and the sample holder in opposite directions to each other along one direction that intersects a central axis of the radial X-ray in synchronization with obtaining the X-ray transmission image by the planar CCD.

6. The X-ray radioscope according to claim 1, wherein, when the sample includes a plurality of parts in a plane, the X-ray radioscope further comprises an image processing unit that identifies and measures a plurality of parts in the sample based on an intensity change of the X-ray transmission image of the sample including X-rays transmitted through the sample.

7. The X-ray radioscope according to claim 6, when each part of the sample has a height h along the central axis of the X-ray, and the sample includes a plurality of parts spaced at an interval t1 along the direction of relative movement between the planar CCD and the sample in the plane, the planar CCD is arranged to satisfy the following equation, wherein the following equation is: $\theta 1 < \arctan(t1/h)$ with respect to a maximum inclination angle $\theta 1$ from the central axis of the X-ray along the direction of relative movement.

8. The X-ray radioscope according to claim 6, when each part of the sample has a height h along the central axis of the X-ray, and the sample includes a plurality of parts in the plane that are spaced apart by an interval t2 along the direction of relative movement between the plane CCD and the sample and the direction perpendicular to the central axis of the X-ray, the planar CCD is arranged to satisfy the following equation, wherein the following equation is: $\theta 2 < \arctan(t2/h)$ with respect to the maximum inclination angle $\theta 2$ of said X-ray from said central axis along a direction perpendicular to said direction of relative movement.

9. The X-ray radioscope according to claim 1, wherein moving speed of the sample to be detected and transfer rate of the image signal generated in the planar CCD are synchronized, and multiple conditions for the moving speed of the sample and the transfer rate of the image signal are set.

* * * * *